US012311826B2

(12) United States Patent
Busiahn

(10) Patent No.: US 12,311,826 B2
(45) Date of Patent: May 27, 2025

(54) LOG HAULER DEVICES, SYSTEMS, AND METHODS

(71) Applicant: Jacob Busiahn, Duluth, MN (US)

(72) Inventor: Jacob Busiahn, Duluth, MN (US)

( * ) Notice: Subject to any disclaimer, the term of this patent is extended or adjusted under 35 U.S.C. 154(b) by 924 days.

(21) Appl. No.: 17/477,029

(22) Filed: Sep. 16, 2021

(65) Prior Publication Data

US 2022/0080874 A1 Mar. 17, 2022

Related U.S. Application Data

(60) Provisional application No. 63/079,843, filed on Sep. 17, 2020.

(51) Int. Cl.
*B66C 1/58* (2006.01)
*B60P 3/41* (2006.01)

(52) U.S. Cl.
CPC .............. *B60P 3/41* (2013.01); *B66C 1/585* (2013.01)

(58) Field of Classification Search
CPC ............. B60P 3/41; B66C 1/585; B66C 19/02
USPC ...................................... 294/82.13
See application file for complete search history.

(56) References Cited

U.S. PATENT DOCUMENTS

| 3,860,282 | A |   | 1/1975 | Johnson |
| 4,591,041 | A | * | 5/1986 | Valier ..................... F16F 15/32 464/68.4 |
| 5,405,238 | A |   | 4/1995 | Samsel, Jr. |
| 5,876,174 | A | * | 3/1999 | Arsenault ................. B60P 3/41 414/23 |
| 5,967,206 | A | * | 10/1999 | Milton ...................... B27L 7/00 144/195.1 |
| 6,921,241 | B2 | * | 7/2005 | Rogers ................. A01G 23/003 414/920 |
| 7,547,180 | B2 | * | 6/2009 | Nye ...................... A01G 23/006 414/734 |
| 7,913,726 | B1 | * | 3/2011 | Honnell .................... B27L 7/06 144/194 |
| 8,444,361 | B1 | * | 5/2013 | Hershey ............... A01G 23/006 414/23 |
| 9,144,918 | B2 | * | 9/2015 | Lindberg ................. B66C 1/585 |
| 10,933,792 | B2 | * | 3/2021 | Mistichelli ............... B60P 3/41 |
| 2006/0045687 | A1 |   | 3/2006 | Finley |
| 2009/0208317 | A1 |   | 8/2009 | Burch |
| 2014/0054526 | A1 | * | 2/2014 | Kalakay, Jr. ............ B66C 23/20 254/226 |
| 2016/0009532 | A1 | * | 1/2016 | Bennette ................... B27L 7/00 144/250.25 |
| 2016/0137118 | A1 | * | 5/2016 | Piacentino ............... B60P 1/52 414/538 |
| 2023/0286337 | A1 | * | 9/2023 | Juday ..................... B60D 1/145 |

OTHER PUBLICATIONS avanttecno.com [online], "Loads of options," 2020, retrieved on Sep. 17, 2020, retrieved from URL <https://www.avanttecno.com/us/accessories>, 6 pages.

(Continued)

*Primary Examiner* — Paul T Chin
(74) *Attorney, Agent, or Firm* — Fish & Richardson P.C.

(57) ABSTRACT

A log hauler device is provided. In some embodiments, an example log hauler device includes a frame attachable to a small machine, and one or more log hauling components attached to the frame.

20 Claims, 11 Drawing Sheets

(56) References Cited

OTHER PUBLICATIONS toro.com [online], Dingo Compact Ultility Loaders, 2019, retrieved on Dec. 10, 2018, retrieved from URL <https://cdn2.toro.com/en/-/media/Files/Toro/SWS/19_sw_490-0272-Dingo-Brochure_FINAL.ashx>, 20 pages.

yardmax.com [online] "Power Trackbarrow with Gas Shock Assist," 2017, retrieved on Sep. 17, 2020, retrieved from URL <https://yardmax.com/wp-content/uploads/2017/05/YD8203_Power-Trackbarrow_Flatbed_FIN_nocrops.pdf>, 2 pages.

yardmax.com [online], "Power Trackbarrow with Gas Shock Assist—Flatbed," Apr. 30, 2017, retrieved on Sep. 17, 2020, retrieved from URL <2) https://yardmax.com/product/power-trackbarrow-w-gas-shock-assist-flatbed/>, 6 pages.

yardmax.com [online], "Yardmax Power Barrows," Apr. 29, 2017, retrieved on Sep. 17, 2020, retrieved from URL <https://yardmax.com/power-barrows/>, 4 pages.

\* cited by examiner

LOG HAULER DEVICES, SYSTEMS, AND METHODS

CROSS-REFERENCE TO RELATED APPLICATIONS

This application claims priority to, and the benefit of, U.S. Provisional Application No. 63/079,843 filed Sep. 17, 2020. The disclosure of the prior application is considered part of, and is incorporated by reference in, the disclosure of this application.

TECHNICAL FIELD

This document describes devices, systems, and methods related to log hauler devices, for example, log hauler devices for a small-tracked machine.

Small machines are commonly used to move loads that are heavy or cumbersome to move manually. For example, small-tracked machines have been used to move landscaping supplies, tools, and other cargo at a job site, and often include a barrow or bed that can be loaded with such cargo.

SUMMARY

Some embodiments described herein include log hauler devices, systems, and methods configured to facilitate loading and movement of logs and other tree material. For example, a log hauler device may be attachable to a small machine to augment the functionality of the small machine, and improve the usefulness of the small machine in hauling logs and other tree material. In some embodiments, the log hauler device may include a frame, one or more attachment features that facilitate secure attachment between the frame and small machine, and one or more log handling components that facilitate manipulation of a log and/or tree material. The log handling components may optionally include a winch, cable, and log tongs attached to the cable. The log tongs may be used to grip a log or other tree material, and the winch may be used to retract the tongs to load the log or other tree material onto a bed of the small machine. In some optional embodiments, the log hauler device may be an attachment that can attach to a small machine to augment or provide different functionality to the small machine.

Some example log hauler devices facilitate handling and moving of logs and other tree material. For example, the small machine may be driven proximate to the material to be loaded, the log hauler device may be used to load the material onto the small machine, and the small machine driven to a removal location where the material can be unloaded from the small machine.

Particular embodiments described herein include a log hauler device that includes a log hauler system, comprising, a powered machine that includes a bed, and a log hauler device removably attachable to the powered machine. The log hauler device includes a frame, a winch attached to the frame, and a log tongs retractable by the winch.

In some implementations, the system can optionally include one or more of the following features. The frame may include an engagement feature configured to engage with a complementary feature of the bed. The complementary feature of the bed may be a recess in a side of the bed. The winch may be a manual hand winch. The winch may be an electric winch. The powered machine may have a rated capacity less than 2000 lbs. The powered machine may have a rated capacity less than 1000 lbs. The frame may include at least two bed frame portions separated by a width that is within 15% of a width of the bed of the powered machine. The frame includes a rear frame portion that extends upwardly from the bed frame portions.

Particular embodiments described herein include a log hauler device that includes a frame and a winch attached to the frame.

In some implementations, the log hauler device can optionally include one or more of the following features. The log hauler device may include a cable retractable by the winch. The log hauler device may include a log tongs attached to the cable. A trailer hitch ball may be attachable to a front, middle, or other portion of the frame. The frame may include first and second bed frame portions, and first and second rear frame portions that extend upwardly from the first and second bed frame portions.

Particular embodiments described herein include a method of hauling logs, including attaching a log hauler device to a powered small machine, loading a log onto a bed of the small machine using a log hauler component attached to the log hauler device, and driving the powered small machine while the log is supported on the bed of the small machine.

In some implementations of the method, one or more of the following features may optionally be included. The log hauler component may include a winch, a cable, and a log tongs attached to the cable. The log hauler device may be movable between a lowered configuration and a raised configuration when attached to the powered small machine. The method may include moving the log hauler device from a lowered configuration to a raised configuration, and wherein loading the log comprises loading the log while the log hauler device is in the raised configuration. The method may include moving the log hauler device from a raised configuration to a lowered configuration, and wherein driving the powered small machine while the log is supported on the bed comprises driving the powered small machine while the log is supported on the bed and the log hauler device is in the lowered configuration.

The devices, system, and techniques described herein may provide one or more of the following advantages. First, some embodiments describe herein facilitate handling and transport of logs and other tree material using a relatively light-duty small machine. The log handling device facilitates loading of material that may be difficult or impossible to load manually, and/or may reduce the manpower required to load or transport tree material. A single individual may load and transport material using an example log hauler device, for example.

Second, some embodiments described herein facilitate handling and transport of logs and other tree materials without substantially impacting the landscape or worksite. For example, a relatively light duty small machine may be used with little or no damage to turf, mulch, pavers, landscaping, etc.

Third, some embodiments described herein provide a compact log handling device that can facilitate handling of relatively large and heavy logs. The log handling devices and/or small machine may thus be transported relatively easy. For example, an example log handling device is sufficiently compact to fit in a light-duty and/or standard pickup truck bed.

Fourth, some embodiments described herein provide a versatile small machine having expanded functionality. The log handling device can facilitate handling and transport of a variety of materials, including landscape supplies, pavers, plants, shrubs, etc. One or more log hauling components may be interchangeable to facilitate loading and handling different materials. For example, a tongs may be interchangeable with a hook, strap, etc.

Fifth, some embodiments described herein provide a small machine suitable for log hauling tasks that are relatively low cost. A small machine can be utilized that is relatively low cost while having capabilities for handling large loads.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

Figure 1:
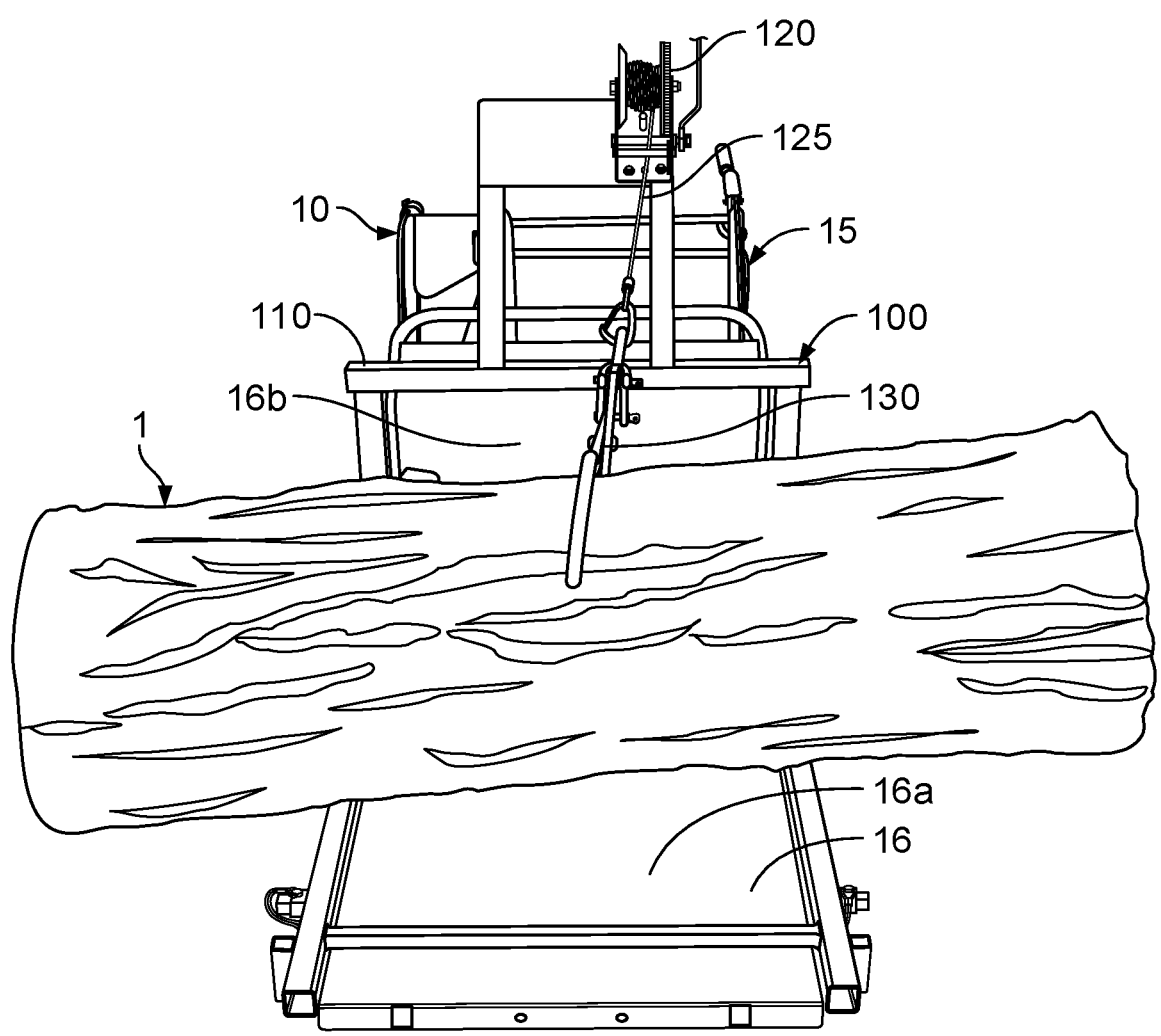
FIG. 1 is a perspective view of an example log hauler device and small machine.

Referring to FIG. 1, an example log hauler system 10 is shown that can be used to load and transport logs and other materials, such as a log 1. Log hauler system 10 includes a machine 15 and a log hauler device 100. Machine 15 may be a powered machine that includes a drive system, and a bed 16 that can support a load to be moved by machine 15. The log hauler device 100 includes a frame 110 and one or more log hauling components, such as a winch 120, cable 125, and log tongs 130. The log hauler device 100 can be used to manipulate log 1, such as lifting log 1 onto a bed 16 of machine 15, and transporting log 1 to a selected destination.

In an example embodiment, machine 15 includes a powered small tracked machine, such as a power track barrow configured to transport a load. The machine 15 may include a drivetrain that includes one or more tracks (FIG. 2) configured to drive machine 15 over varied terrain at a worksite. The machine 15 includes a bed 16 that includes a floor 16a and/or one or more walls 16b. The bed 16 supports logs and other material during use of log hauler system 10.

Figure 2:
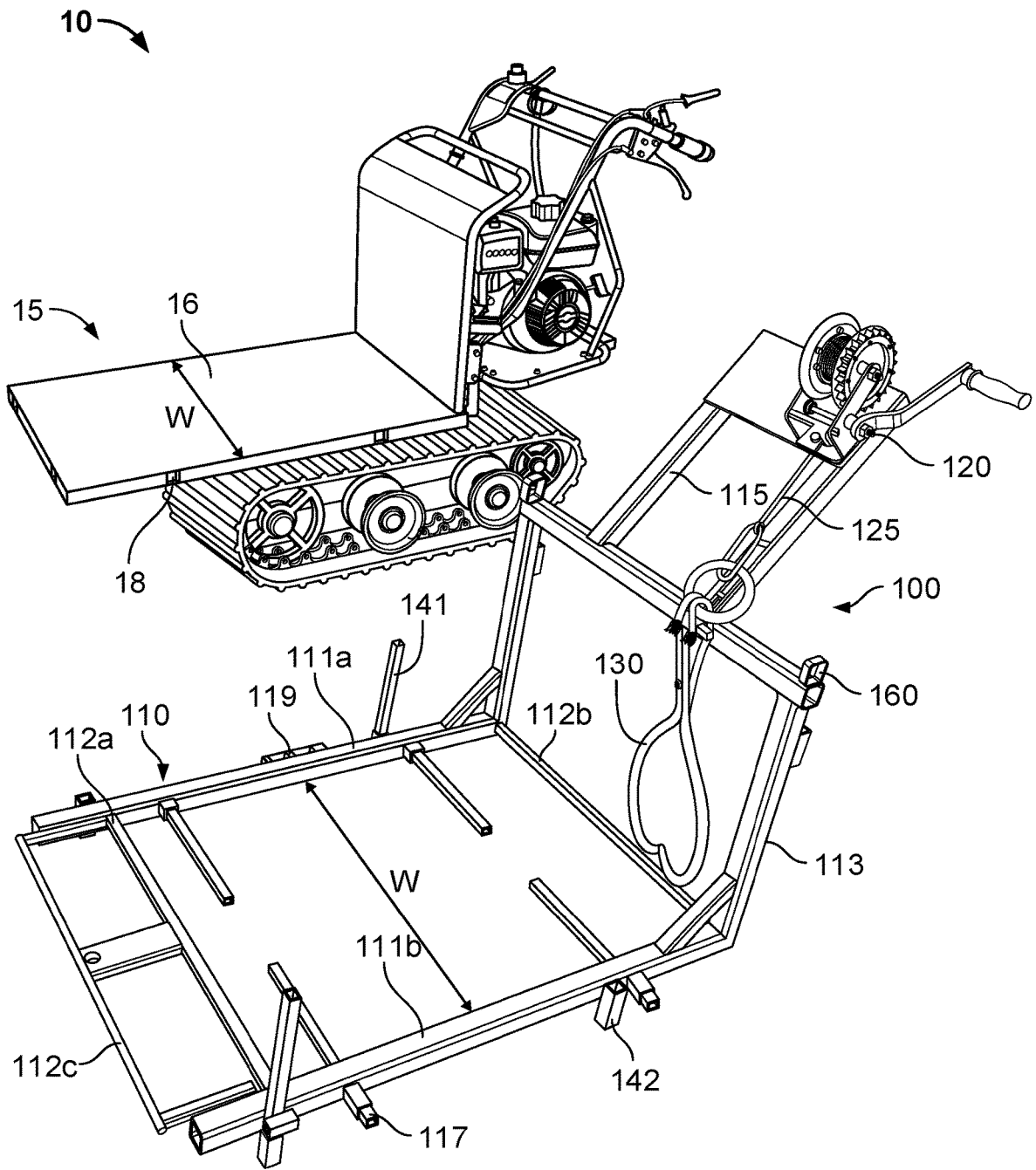
FIGS. 2-4 are perspective views of the example log hauler device of FIG. 1.
Figure 3:
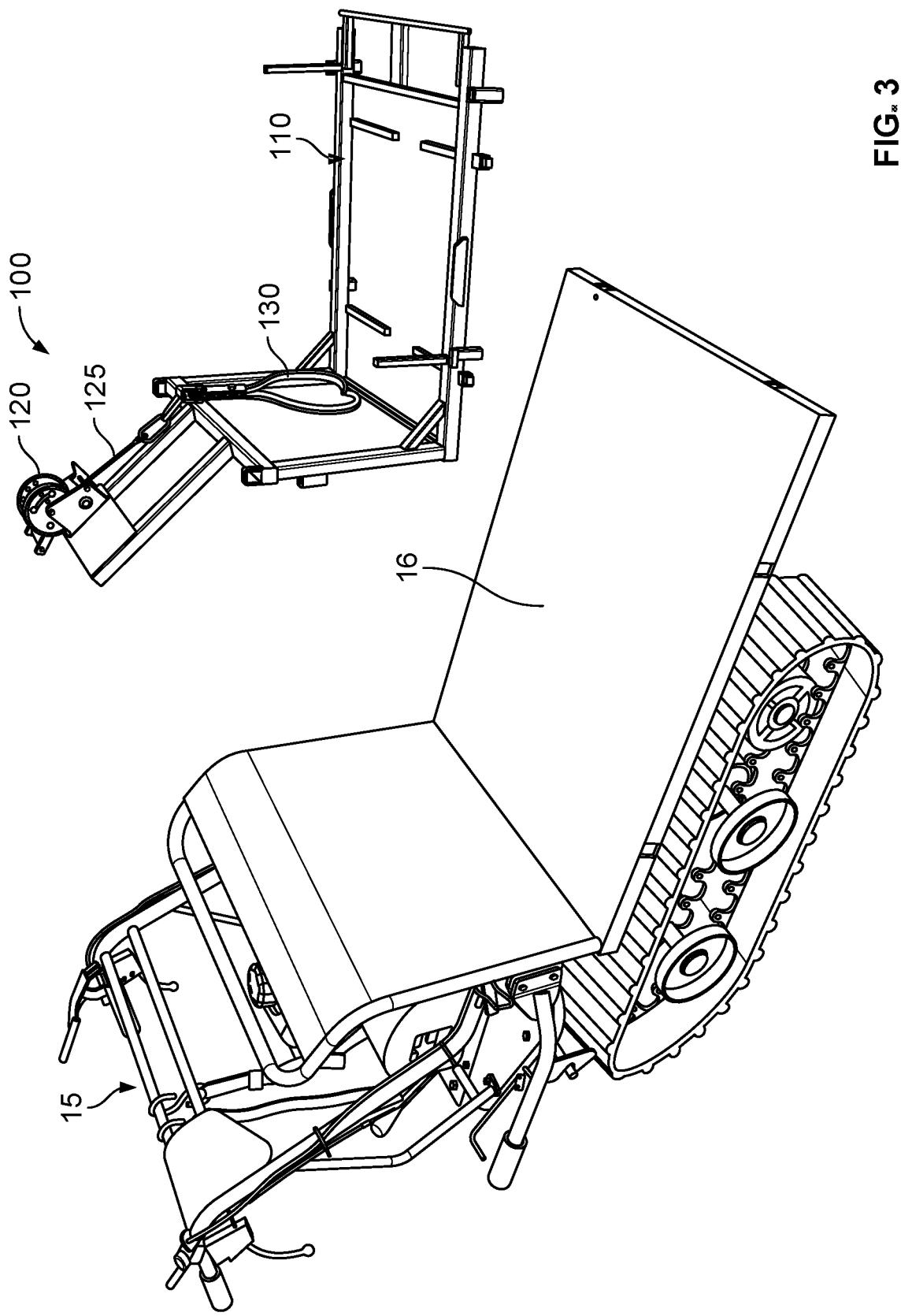
Figure 4:
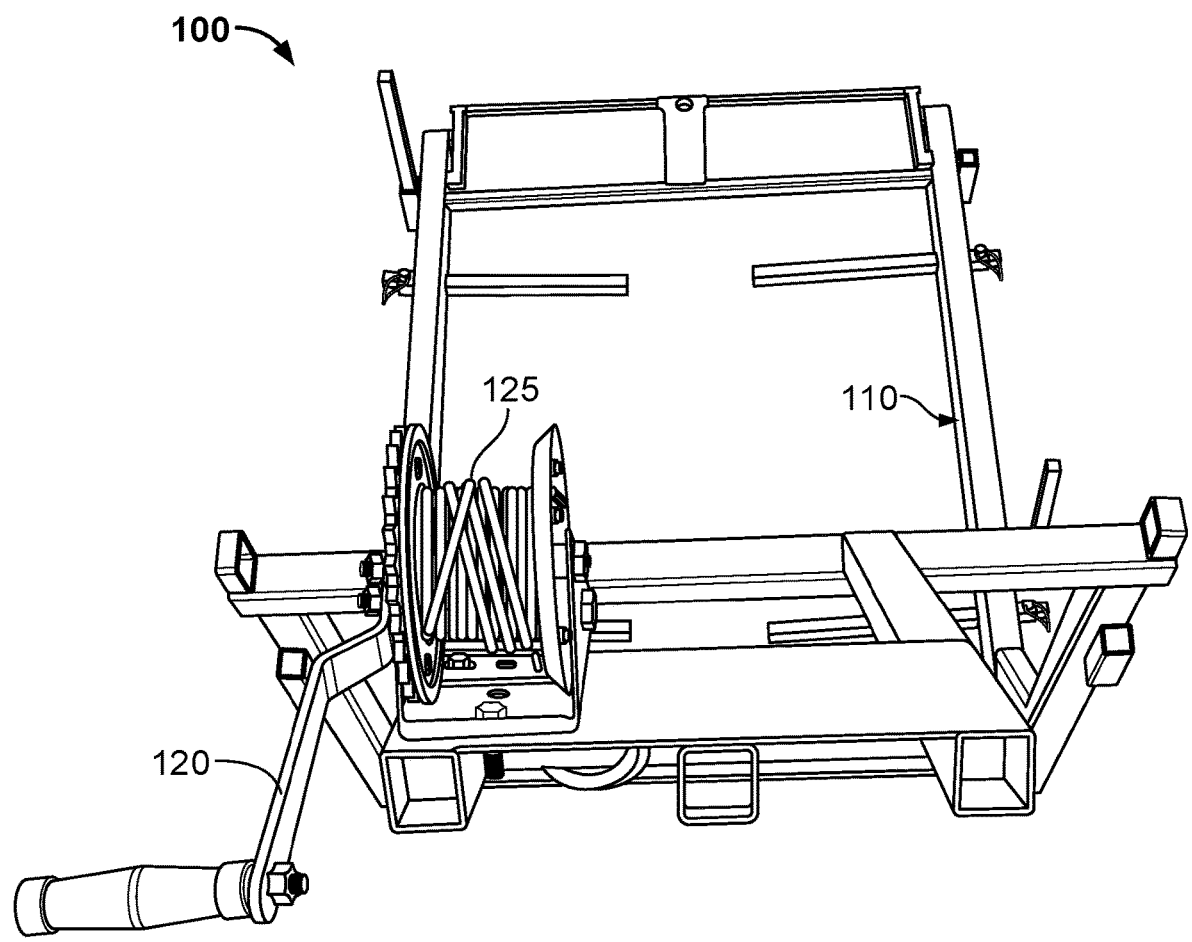

Referring to FIG. 2, an example machine 15 and log hauler device 100 are shown. Log hauler device 100 may be configured as an attachment that may be readily attached and detached from machine 15. For example, log hauler device 100 can be configured as an accessory or retrofit component that provides enhanced functionality to machine 15.

Log hauler device 100 includes a frame 110 that includes one or more substantially rigid frame portions and/or imparts structure to log hauler device 100. In an example embodiment, frame 110 is made from metal tubing, such as square steel tube and/or rolled steel rod, welded to form frame 110. Alternatively or in addition, frame 110 may include one or more materials, such as aluminum, stainless steel, iron, titanium, carbon fiber, and/or other materials, and one or more cross-sectional shapes, such as circular, elliptical, triangular, or other shapes. For example, frame 110 may include extruded aluminum sections secured by mechanical fasteners.

Frame 110 includes two rigid bed frame portions 111a, 111b. In an example embodiment, bed frame portions 111 extend substantially parallel to one another and are separated a distance (W) that is similar to or slightly larger than a width of a bed, such as a width (w) of bed 16. In some embodiments, frame 110 includes one or more crossbars 112a, 112b that extend between bed frame portions 111a, 111b. Crossbars 112a and/or 112b may be configured to at least partially support log hauler device 100 on bed 16 of machine 15, and/or to provide structural rigidity to frame 100 that inhibits rigid bed frame portions 111a, 111b from twisting out of a common plane. Crossbars 112a, 112b may have a smaller cross-section to facilitate positioning across a bed, such as bed 16, while bed frame portions 111a, 111b are located on opposing sides and extend at least partially below an upper surface of bed 16. In an example embodiment, crossbars 112 may include a front crossbar 112c. Front crossbar 112c may be used as an attachment point for the winch cable 125 to secure cargo onto the device (e.g., such as multiple logs loaded onto bed 16). Alternatively or additionally, front crossbar 112c may provide an attachment point of for light tree rigging. In an example embodiment, front crossbar 112c includes a rolled steel bar.

Log hauler device 100 may include one or more features that promotes stability of a log or other material being handled by log hauler device 100. In an example embodiment, log hauler device 100 includes posts 141. Posts 141 extend upwardly from bed frame portions 111a, 111b, and inhibit a log or other material from rolling or sliding forwardly, such as when the machine decelerates or is traversing a downward slope, and/or act as a backstop when a log is loaded/held in positions with the log tongs. Posts 141 may be removably attachable with a component of frame 110. For example, frame 110 may include complementary mating features 142, such as complementary receptacles, that engage with posts 141. Posts 141 may be received in complementary receptacles 142, and secured by a pin that extends through a wall of posts 141 and receptacles 142, respectively, a snap fit, interference fit, etc. Log hauler device 100 may include one post, two posts, three posts, four posts, or more than four posts, to facilitate stability during handling of logs and other material. Alternatively or additionally, frame 110 may include one or more walls or rails attachable with complementary mating features 142 and/or other complementary mating features of frame 110.

In an example embodiment, one or more posts 141, may be movable to various locations of frame 110. For example, frame 110 may include complementary mating features 142 located at different locations along bed frame portions 111a, 111b. A user may select where to engage posts 141 depending on a particular task. Posts 141 may be removed or engaged with complementary mating features 142 located near a rear of frame 110, such as to facilitate loading material or handling a log secured by tongs 130. Posts 141 may be engaged with complementary mating features 142 located near a front of frame 110 when transporting material, such as several logs or material. Posts 141 located near the front of frame 110 may facilitate stability of the logs/material on the log hauler device 100 during transport.

Alternatively or in addition, machine 15 and/or log hauler device 100 may include one or more other components that facilitate secure positioning of a log or other material on bed 16 during movement of machine 15. In an example embodiment, frame 110 includes one or more protrusions 119 that contact logs and or other material on supported by bed 16 to inhibit sliding during movement of machine 15. Protrusions 119 may be formed by a plate secured to a surface of frame 110. The plate can dig into or otherwise frictionally engage with the log or other material to prevent sliding. In some embodiments, protrusions 119 may be provided by a roughened surface treatment of at least portions of frame 110.

Frame 110 may include one or more portions that extend upwardly relative to bed frame portions 111. In an example embodiment, frame 110 includes rear frame portions 113 that extend generally orthogonally relative to bed frame portions 111. Rear frame portions 113a, 113b may extend upwardly a distance to position one or more log hauling components at a vertical height above bed 16 when frame 110 is attached to machine 15.

Alternatively or additionally, frame 110 includes angled portions 115 that extend at an angle relative to bed frame portions 111 and rear frame portions 113. Angled portions 115 extend upwardly and rearwardly. One or more log hauling components can be supported by angled portions 115, such as winch 120. The rearward angle of angled portions 115 may be configured to support winch 120 at an ergonomic location where it can be readily operated by a user without substantial interference with other features of log hauler device 100 or machine 15.

Frame 110 may include one or more accessory attachment locations, such as accessory attachment location 160. In an example embodiment, accessory attachment locations 160 includes a rigid component on frame 110, such as attached to rear frame portion 113. The accessory attachment location 160 may include a loop, hook, clamp, etc. In some embodiments, accessory attachment location 160 is configured to receive a rope or strap to secure a bin to frame 110. Alternatively or additionally, accessory attachment location 160 provides an attachment point for a rope, which can be used to drag logs, brush, etc. Frame 110 may include multiple accessory attachment locations 160 at different positions and heights of frame 110 to facilitate attachment of different accessories.

The proportions of frame 110 may facilitate attachment with machine 15, manipulation and transportation of logs or other material, and structural integrity that can accommodate significant weight and an extended number of loading and unloading cycles. In an example embodiment, a length of bed frame portions 111 is greater than a height of rear frame portions 113. In various example embodiments, the length of bed frame portions 111 may be between about 70% and 300%, between about 100% and 200% or about 150% of a height of rear frame portions 113.

The one or more log hauling components of log hauler device 100 may include winch 120, cable 125, and log tongs 130. The log hauling components cooperate to facilitate manipulation of logs and/or other materials using log hauler device 100 and machine 15. Cable 125 may be extended to facilitate grabbing a log or other material using log tongs 130, and subsequently retracted to load the log or other material. In various example embodiments, cable 125 may be a metal cable (e.g., steel cable), strap (e.g., nylon strap), rope, etc.

In various example embodiments, winch 120 is a manual winch that includes a hand crank for retracting cable 125. Winch 120 provides a mechanical advantage that facilitates manipulation of logs and other material by operation of the hand crank. In various example embodiments, winch 120 may include a powered winch, such as an electric winch. In an example embodiment, winch 120 and cable 125 are rated for a capacity of at least 1000 lb. In various example embodiments, winch 120 has a capacity rating between 250 lbs. and 10000 lbs., 750 lbs. and 5000 lbs., or between 800 lbs. and 1500 lbs.

Log hauler device 100 includes one or more attachment features that facilitate secure attachment between frame 110 and machine 15. In an example embodiment, frame 110 includes one or more engagement features 117 configured to engage with complementary features of machine 15. Engagement features 117 include channels that can be aligned with recesses 18 of machine 15. In an example embodiment, frame 110 includes two channels 117 near a front of frame 110 and two channels 117 near a rear of frame 110. Channels 117 are configured to be aligned with recesses 18 and a rod, pin, bar, etc. secured through respective channels 117 and recesses 18 to secure log hauler device 100 to machine 15. In various example embodiments, frame 110 may include one, two, three, four, or more than four engagement features 17 configured to facilitate engagement with complementary features of machine 15.

In various example embodiments, the one or more engagement features 117 may include snap-fit connectors, spring-loaded connectors, straps, threaded fasteners, etc. The engagement features 117 may engage with a bottom, top, side, protrusion, recess, and/or other features of bed 16 or other feature of machine 15.

Figure 5:
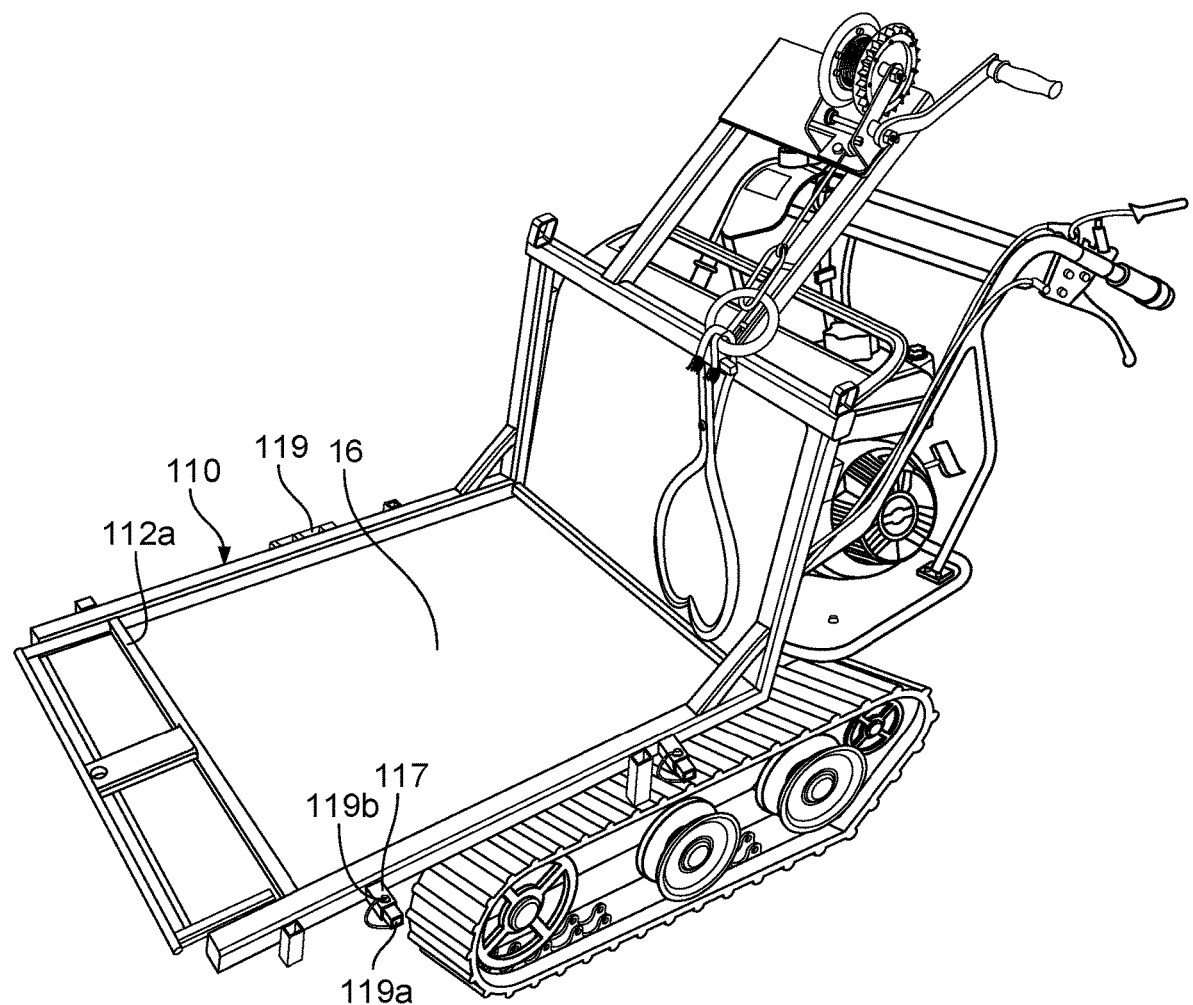
FIG. 5 is a perspective view of the example log hauler device of FIG. 1 attached to a small tracked machine.

Referring to FIG. 5, log hauler device 100 is shown attached to machine 15. Log hauler device 100 is positioned on and at least partially supported by bed 16 of machine 15. Bed frame portions 111 extend along longitudinal edges of bed 16, and crossbars 112 extend across bed 16. Frame 110 can be supported on bed 16 at least partially by crossbars 112. Rear frame portions 113a, 113b are located near a rear of bed 116 and may abut or engage with a rear wall of bed 16.

In an example embodiment, log hauler device 100 is configured as an attachment that may be readily attached and detached from machine 15. Log hauler device 100 provides an accessory that can be attached to machine 15 (e.g., by an end-user) to facilitate handling logs and other material, and can be removed/replaced to facilitate other tasks using machine 15. Alternatively or additionally, log hauler device 100 can be an integral portion of machine 15 that is permanently or semi-permanently attached with other portions of machine 15. For example, frame 110 of log hauler device 100 and bed 16 may be formed together such that the bed and frame 110 are usable together and not separable during operation of machine 15. In such embodiments, bed 16 may be constructed using relatively heavy-duty materials (e.g., such as the square steel tubing and/or other materials described above with reference to frame 100), such that bed 16 is rated for an expected capacity of logs and other materials. One or more log hauling components, such as winch 120, cable 125, log tongs 130, may be directly attached to bed 16 and/or another feature of machine 15.

Figure 6:
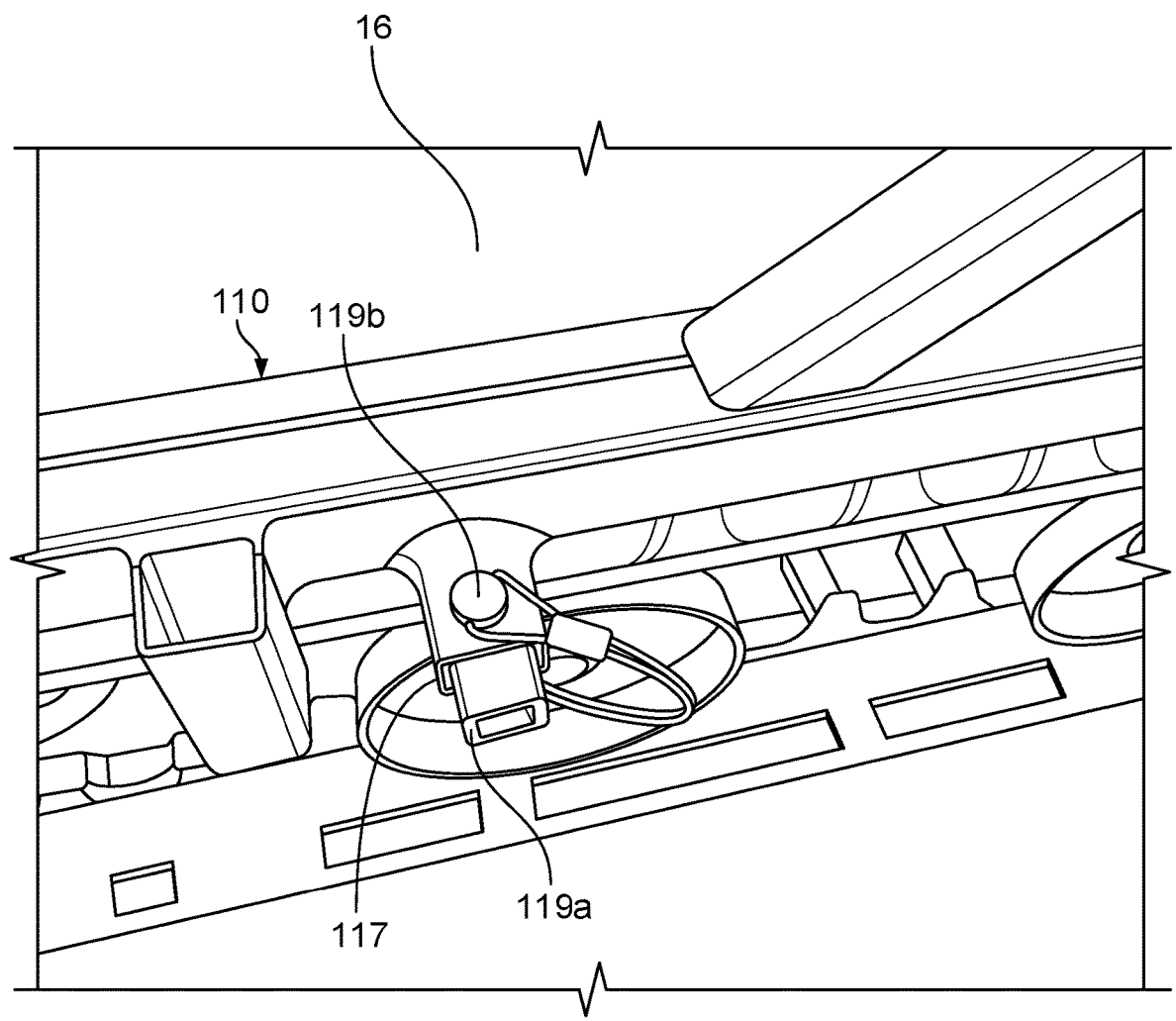
FIG. 6 is a perspective view of an attachment mechanism of the log hauler device of FIG. 1.

Referring to FIGS. 5 and 6, channels 117 are aligned with recesses 18 (FIG. 2), and a bar 119a is positioned through channels 117 and recesses 18. Bar 119a inhibits sliding movement of frame 110 relative to bed 16. Pin 119b inhibits sliding movement of bar 119a within the channels 117 and recesses 18. Bars 119a and pins 119b provide a robust attachment between log hauler device 100 and bed 16 that inhibits relative movement during operation. Alternatively or in addition, frame 110 imparts bed 16 with additional structural rigidity that facilitates handling of heavy logs and other material without flexing or deforming bed 16 or other components of machine 15.

Figure 7:
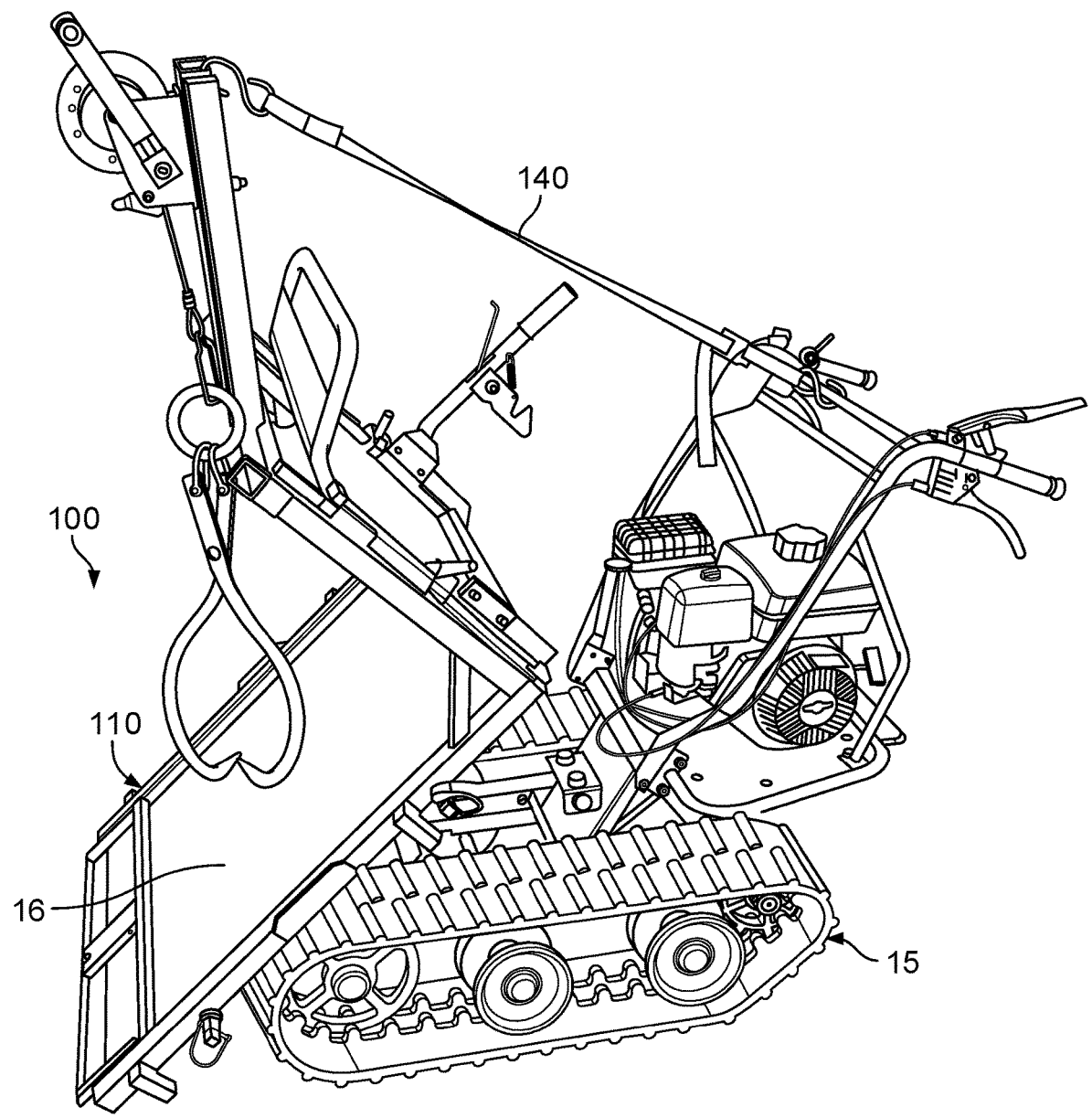
FIG. 7 is a perspective view of the log hauler device of FIG. 1 with the log hauling device in a raised position.

In an example embodiment, bed 16 and/or log hauler device 100 can be moved between lowered (e.g., flat) and raised (e.g., angled) configurations. Bed 16 and log hauler device 100 are shown in a lowered configuration in FIG. 2 and in a raised configuration in FIG. 7. The lowered configuration can facilitate stability of logs and other material on bed 16 while machine 15 is driven to transport the logs or other material (e.g., across a worksite). A raised configuration can facilitate loading the log hauler device 100. For example, log tongs 130 can be attached to a log, and cable 125 retracted via winch 120 while the bed 16 and log hauler device 100 are in the raised position such that the log is drawn onto the bed 16 and/or log hauler device. Bed 16 and log hauler device 100 can be returned to the lowered configuration for transporting the log. The raised configuration can similarly facilitate unloading of log hauler device 100. For example, with tongs 130 removed from the log, bed 16 and log hauler device 100 can be moved to the raised configuration such that logs or other material can be removed from bed 16 at least partially assisted by gravity.

Log hauler system 10 may include one or more features that at least partially support the log hauler device 100 and/or bed 16 in a raised configuration. For example, log hauler device 100 and/or bed 16 can be supported by a robust hinge mechanism sufficient to handle the forces exerted by the log hauler device 100, bed 16, and/or one or more logs or other material on the device (e.g., gripped by log tongs 130) when in the raised position. Alternatively or in addition, log hauler system 10 may include one or more travel limit or reinforcing features, such as strap or arm 140. Strap or arm 140 may be connected between a fixed feature of machine 15 and log hauler device 100 and/or bed 16. Strap or arm 140 may have a length that limits the travel of log hauler device 100 and/or bed 16 between lowered and raised configurations, and/or that least partially supports log hauler device 100 and/or bed 16 in the raised position (e.g., lessening the force exerting on a hinge, piston, spring, and/or other mechanisms that support log hauler device 100 and/or bed 16. In some example embodiments, strap or arm 140 may also facilitate movement of log hauler device 100 and/or bed 16 from the raised configuration to the lowered position, such as by manually manipulating the strap or arm, and/or by a powered mechanism that retracts the strap or arm.

In various example embodiments, log hauler device 100 and bed 16 move together between lowered and raised configurations. For example, log hauler device 100 is substantially immovably affixed with bed 16, such that raising and lowering bed 16 causes log hauler device 100 to similarly raise and lower. Alternatively or in addition, log hauler device 100 may be movably affixed to machine 15 and/or bed 16 such that log hauler device 100 may hinge or move between lowered and raised configurations independent of machine 15 or bed 16.

Figure 8:
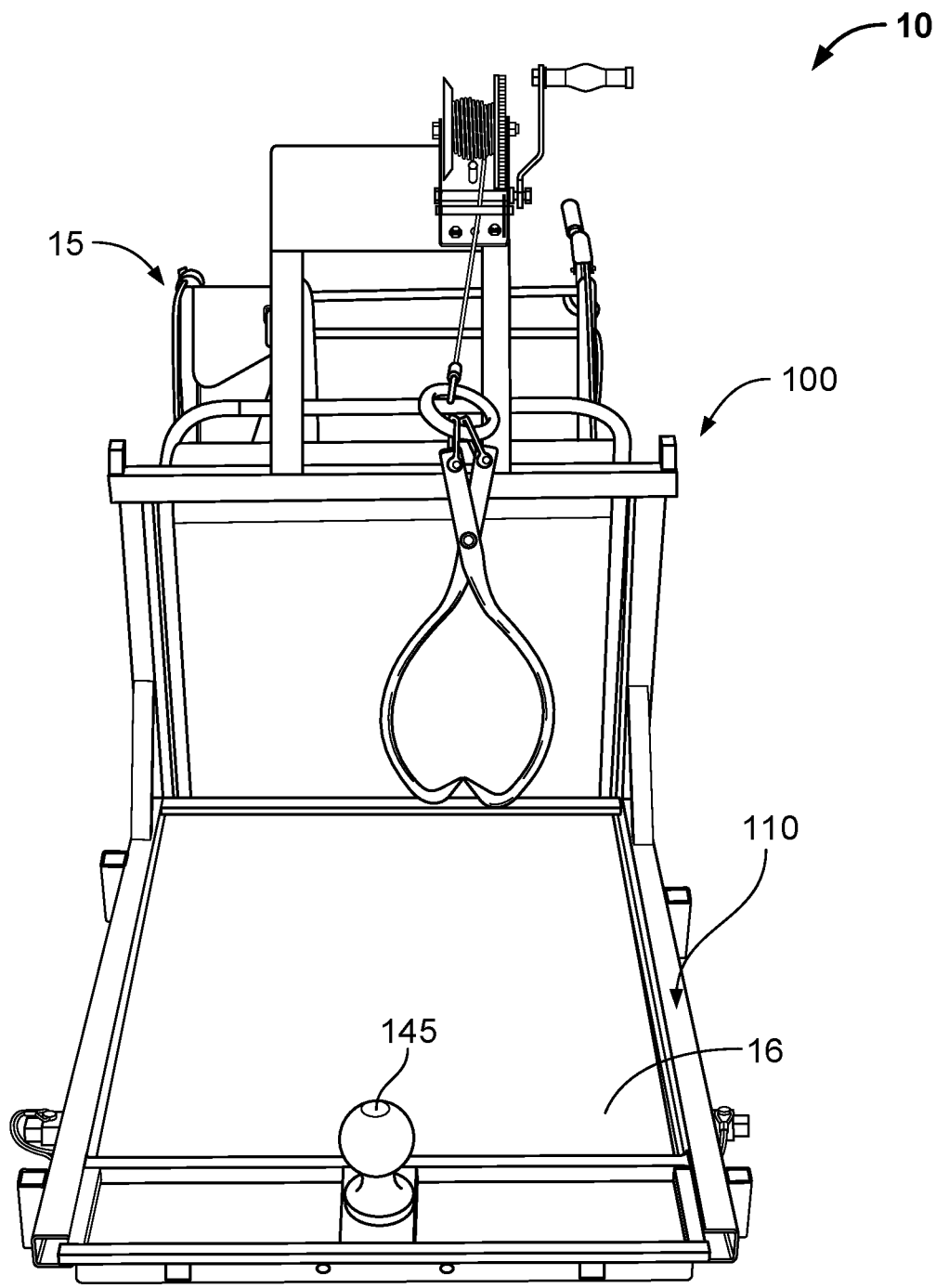
FIG. 8 is a perspective view of an example log hauler device including a front attachment feature.

Referring now to FIG. 8, example log hauler system 10 is shown including an attachment location 145. Attachment location 145 facilitates attachment of one or more additional components with log hauler system 10, such as a trailer or barrow, for example. Log hauler system 10 can push and/or pull the additional components via attachment location 145. Alternatively or additionally, front attachment location 145 may facilitate attachment to another machine or powered device, and can be used to push and/or pull log hauler system 10. In an example embodiment, front attachment location 145 includes a trailer hitch ball configured to engage with a complementary hitch receiver.

In an example embodiment, attachment location 145 is located at a front location of machine 15. In some embodiments, attachment location 145 is located at a middle or rear portion of machine 15. The location of attachment location 145 may be selected to facilitate even weight distribution (e.g., over the track/wheels of the machine 15).

Figure 9:
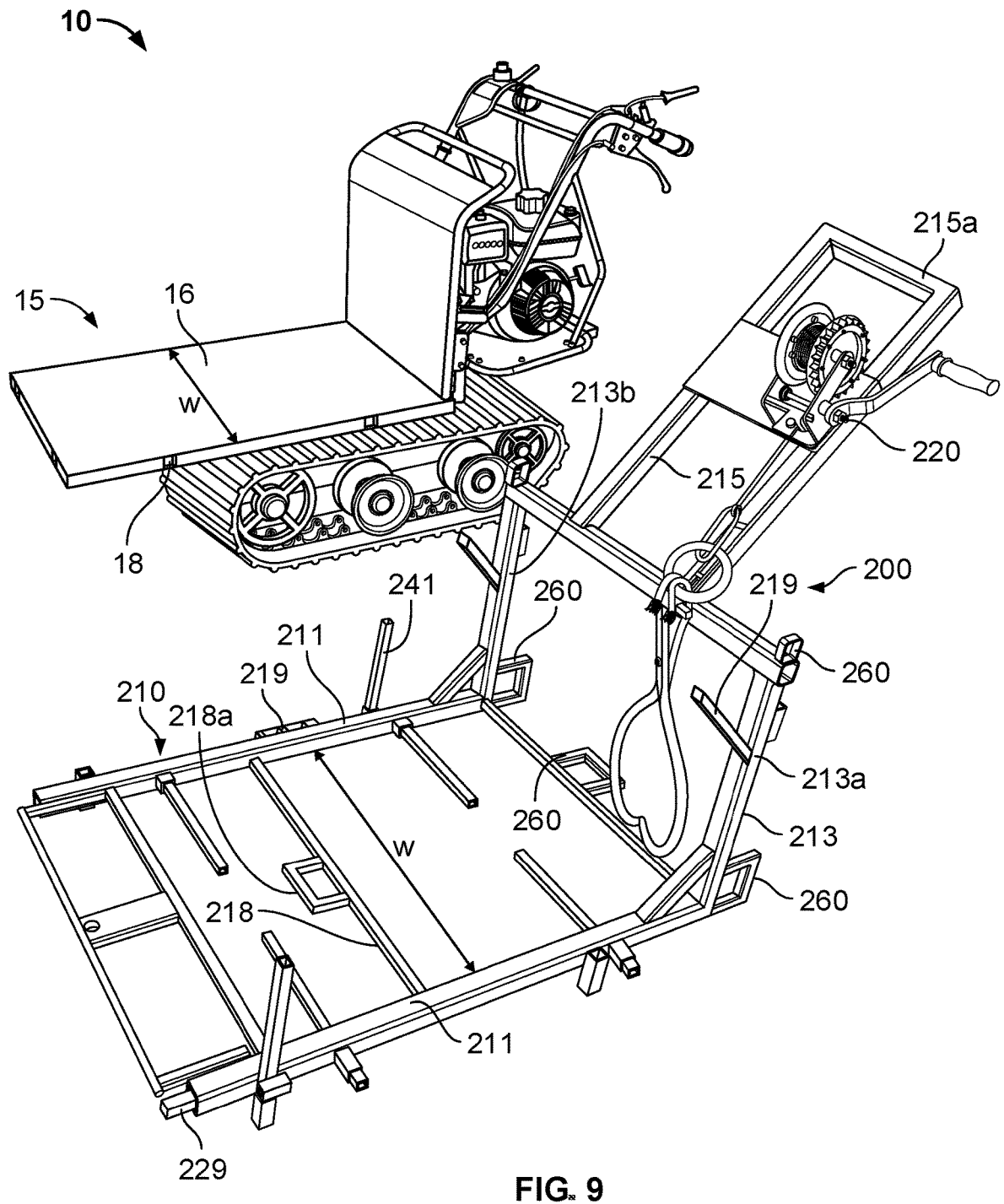
FIG. 9 is a perspective view of another example log hauler device.

Referring now to FIG. 9, an example machine 15 and log hauler device 200 of log hauler system 10 are shown. Log hauler device 200 may be configured as an attachment that may be readily attached and detached from machine 15, such as attachable in conjunction with bed 16 of machine 15. In various example embodiments, log hauler device 200 includes one or more features of log hauler device 100 described above with reference to FIGS. 1 through 8.

Log hauler device 200 includes a frame 210 that includes one or more substantially rigid frame portions and/or imparts structure to log hauler device 200. In an example embodiment, frame 210 is made from metal tubing, such as square steel tube and/or rolled steel rod, welded to form frame 210. Alternatively or in addition, frame 210 may include one or more materials, such as aluminum, stainless steel, iron, titanium, carbon fiber, and/or other materials, and one or more cross-sectional shapes, such as circular, elliptical, triangular, or other shapes. For example, frame 210 may include extruded aluminum sections secured by mechanical fasteners.

Frame 200 includes a crossbar 218 that extends at least partially between portions of frame 210, and/or may be configured to at least partially support log hauler device 200 on bed 16 of machine 15. Alternatively or additionally, crossbar 218 provides structural rigidity to frame 200 that inhibits twisting of the frame. In an example embodiment, crossbar 218 includes one or more attachment points 218*a*, such as for a winch cable to secure cargo onto the device, light tree rigging, and/or a ball hitch. In an example embodiment, crossbar 218 spaced from front and rear ends of the frame (e.g., proximate a central location) can facilitate support of the weight of a trailer or other component attached at the attachment location generally centrally over tracks of the machine 15. In some embodiments, attachment point 218*a* (e.g., including a hitch ball) is one of multiple attachment points located on crossbar 218 and/or frame 210.

Frame 210 includes one or more portions that extend upwardly relative to bed frame portions 211. In an example embodiment, frame 210 includes rear frame portions 213 that extend generally orthogonally relative to bed frame portions 211. Rear frame portions 213*a*, 213*b* may extend upwardly a distance to position one or more log hauling components at a vertical height above bed 16 when frame 210 is attached to machine 15.

Alternatively or additionally, frame 210 includes attachment portions 219 that extend from rear frame portions 213. For example, attachment portions 219 extend at an angle relative to rear frame portions 213 and or bed frame portions 211. The attachment portions 219 facilitate positioning of cargo (e.g., logs) below and/or at least partially supported by the attachment portions 219. Alternatively or additionally, attachment portions 219 can facilitate positioning the cargo such that the center of mass of the cargo is located relatively further towards the rear of machine 15.

In some embodiments, frame 210 includes portions 215 that extend (e.g., at an angle) relative to bed frame portions 211 and rear frame portions 213. Angled portions 215 extend upwardly and rearwardly. One or more log hauling components can be supported by angled portions 215, such as winch 220. In an example embodiment, portions 215 includes a handle 215a, such as a retractable/extendable handle 215a movable and lockable into a position selected by an operator. The handle 215a can be gripped by the operator (e.g., during operation of machine 15) and facilitate leverage for pulling or otherwise handling the frame 210, such as when cargo is loaded.

Frame 210 includes one or more accessory attachment locations, such as accessory attachment locations 260. In an example embodiment, accessory attachment locations 260 includes a rigid component on frame 210, such as attached to rear frame portion 213. The accessory attachment location 260 may include a loop, hook, clamp, etc. In some embodiments, accessory attachment location 260 is configured to receive a rope or strap to secure a bin to frame 210. Alternatively or additionally, accessory attachment location 260 provides an attachment point for a rope, which can be used to drag logs, brush, etc. Frame 210 may include multiple accessory attachment locations 260 at different positions and heights of frame 210 to facilitate attachment of different accessories.

Frame 210 includes one or more features that facilitate manipulation of logs or other material that is not loaded onto frame 210. For example, frame 210 includes a protrusion 229 proximate a front of frame 210. The protrusion can be driven into an object to push or manipulate the object without loading the object onto the frame. In various embodiments, the protrusion 229 includes a spike, rod, and/or bumper, for example, and is movable between a retracted configuration (e.g., at least partially stowed within a portion of frame 210) and an extended configuration (e.g., in which the protrusion defines a leading portion of frame 210).

Figure 10A:
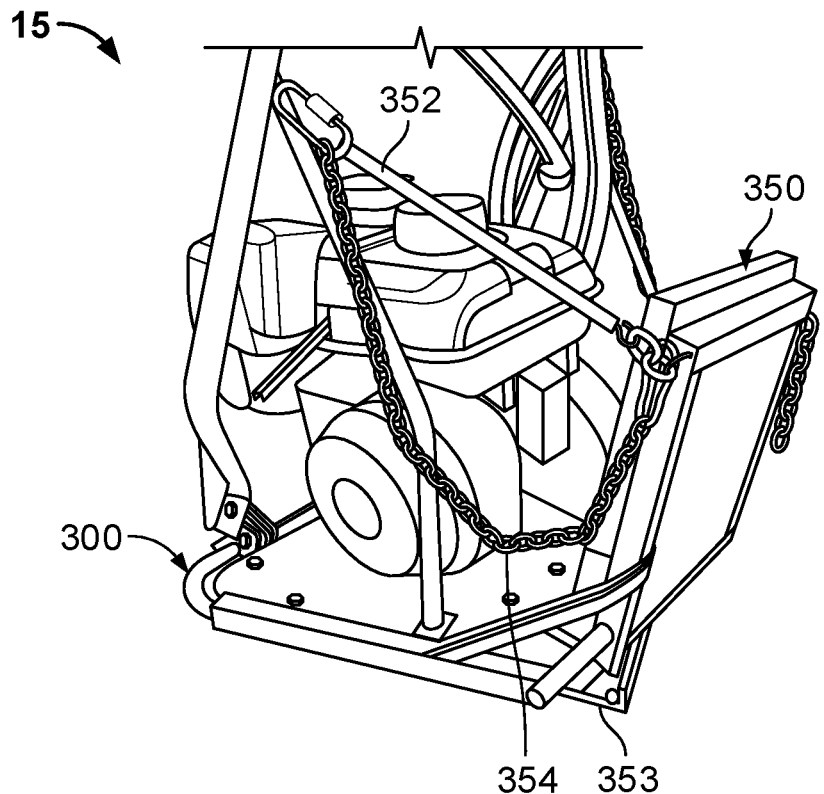
FIGS. 10A and 10B are perspective views of an example log hauler device having a platform in first and second configurations.
Figure 10B:
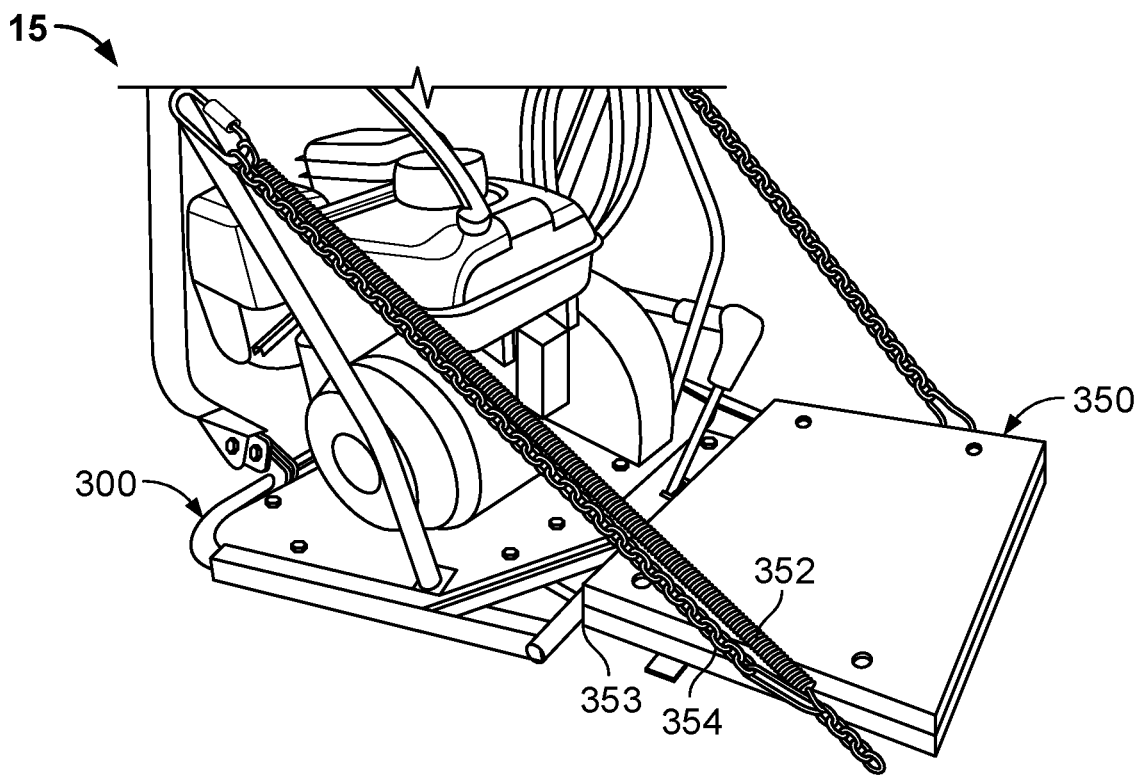

Referring now to FIGS. 10A and 10B, an example machine 15, log hauler device 300, and platform 350, are shown. Log hauler device 300 and/or platform 350 may be configured as attachments that may be readily attached and detached from machine 15. In various example embodiments, log hauler device 300 includes one or more features of log hauler devices 100 and/or 200 described above with reference to FIGS. 1 through 9.

Platform 350 provides a surface that at least partially supports an operator or other object during operation of machine 15. In an example embodiment, platform 350 is adjustable between a retracted position (FIG. 10A) and an extended position (FIG. 10B). In the retracted configuration, the platform 350 is in a folded or angled position. For example, when in the retracted position, the operator can walk beyond machine 15 (e.g., while operating machine 15). In the extended position, the platform is substantially horizontal such that the operator can apply at least a portion of their weight to platform 350. The platform 350 facilitates counterbalancing the weight of cargo loaded onto machine 15, for example. Alternatively or additionally, platform 350 can support some or all of the weight of the operator such that the operator can kneel or sit on platform 350 to ride machine 15.

In an example embodiment, platform 350 is biased to the retracted position. Springs 352 extend between platform 350 and/or a portion of machine 15. Alternatively or additionally, platform 350 is joined with machine 15 by a biased hinge or other component that biases platform 350 to the retracted position. In some embodiments, a rigid frame component 353 is located below a portion of platform 350, and/or an inextensible chain or other component is attached with a portion of platform 350, to limit the travel of platform 350 and at least partially support platform 350 in the extended position.

Figure 11:
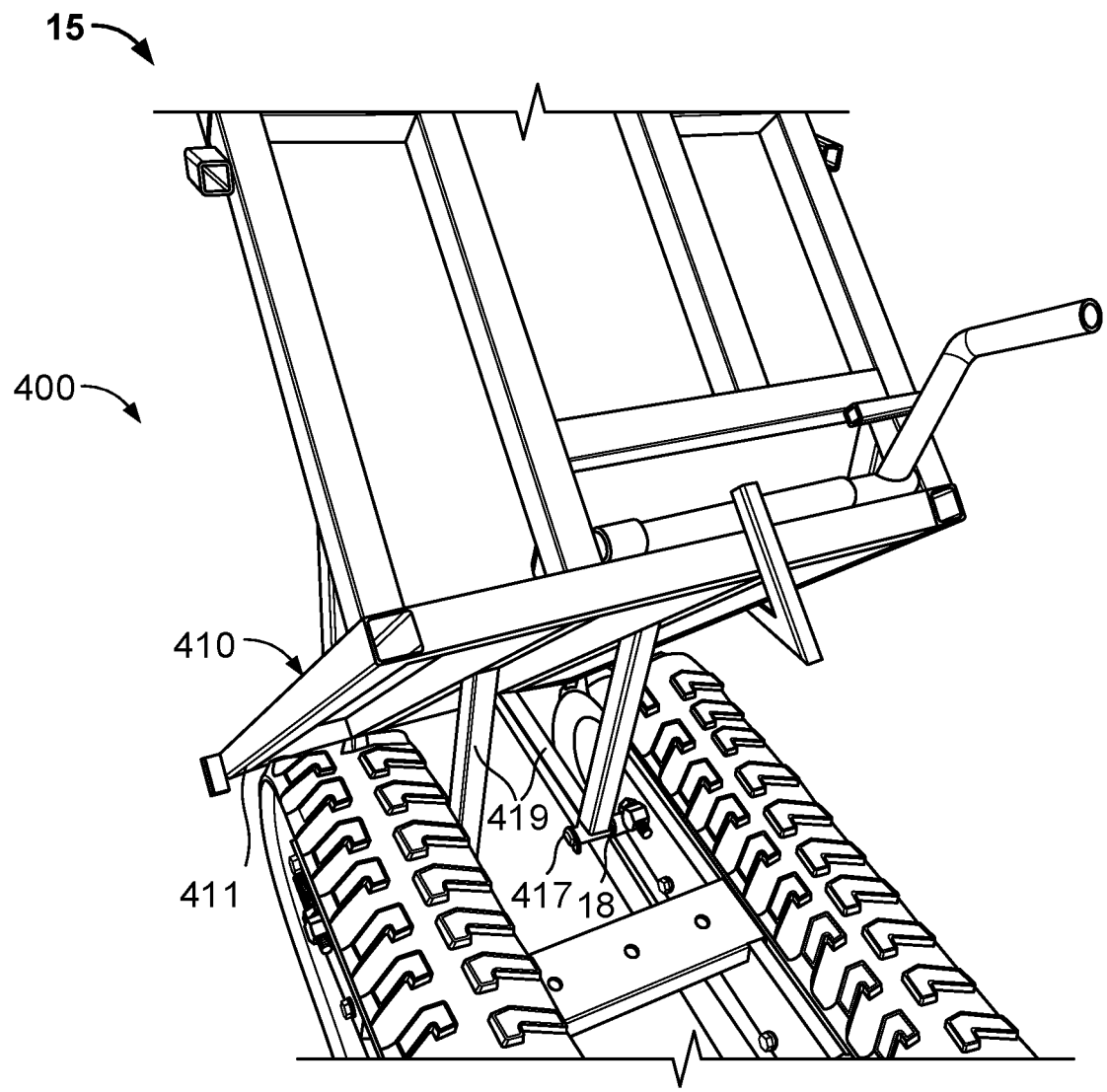
FIG. 11 is a perspective view of another example log hauler device.

Referring now to FIG. 11, an example machine 15 and log hauler device 400 are shown. In various example embodiments, log hauler device 400 includes one or more features of log hauler devices 100, 200, and/or 300 described above with reference to FIGS. 1 through 10B.

Log hauler device 400 includes a frame 410 that includes one or more substantially rigid frame portions and/or imparts structure to log hauler device 400. In an example embodiment, bed frame portions 411 extend substantially parallel to one another and are separated a distance that is similar to or slightly larger than a width of wheels or tracks of machine 15.

Log hauler device 400 includes one or more attachment features that facilitate secure attachment between frame 410 and machine 15. In an example embodiment, frame 410 includes one or more engagement features 417 configured to engage with complementary features of machine 15. Engagement features 417 include channels that can be aligned with recesses of machine 15. The channels are configured to be aligned with recesses 18 and a rod, pin, bar, etc. secured through respective channels and recesses 18 to secure log hauler device 400 to machine 15. In example embodiments, frame 410 includes two v-shaped frame sections 419 that extend downward from bed frame portions 411, for example. Engagement features 417 are located near a lower end of the frame sections 419. Such a configuration can facilitate attachment at a relatively low position on machine 15 (e.g., below an upper portion of the wheels/tracks. Alternatively or additionally, such attachment can facilitate pivoting movement of the log hauler device 400 relative to machine 15 (e.g., to facilitate loading/unloading of cargo).

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:
1. A log hauler system, comprising:
a powered machine;
a log hauler device removably attachable to the powered machine, the log hauler device including:
a frame; and
a winch attached to the frame;

wherein the log hauler device is movable between a lowered configuration and a raised configuration when attached to the powered machine;

wherein while the log hauler device is in the raised configuration, the log hauler device is configured to move a log onto the powered machine using the winch; and wherein the powered machine is configured to be driven while the log is on the powered machine and the log hauler device is in the lowered configuration.

2. The log hauler system of claim 1, wherein the frame includes an engagement feature configured to engage with a complementary feature of a bed of the log hauler system.

3. The log hauler system of claim 2, wherein the complementary feature of the bed is a recess in a side of the bed.

4. The log hauler system of claim 1, wherein the winch is a manual hand winch.

5. The log hauler system of claim 1, wherein the winch is an electric winch.

6. The log hauler system of claim 1, wherein the powered machine has a rated capacity less than 2000 lbs.

7. The log hauler system of claim 1, wherein the powered machine has a rated capacity less than 1000 lbs.

8. The log hauler system of claim 1, wherein the frame includes at least two bed frame portions separated by a width that is within 15% of a width of a bed of the log hauler system.

9. The log hauler system of claim 8, wherein the frame includes a rear frame portion that extends upwardly from the bed frame portions.

10. A log hauler device, comprising:
a frame; and
a winch attached to the frame;
wherein the log hauler device is movable between a lowered configuration and a raised configuration when attached to a powered machine;
wherein when the log hauler device is in the raised configuration the log hauler device is configured to move a log onto a bed using the winch; and
wherein when log hauler device is in the lowered configuration and the log is supported in the bed, the log hauler device is configured to be driven by the powered machine.

11. The log hauler device of claim 10, further comprising a cable retractable by the winch.

12. The log hauler device of claim 11, further comprising a log tongs attached to the cable.

13. The log hauler device of claim 10, wherein a trailer hitch ball is attached to a front portion of the frame.

14. The log hauler device of claim 10, wherein the frame includes first and second bed frame portions, and first and second rear frame portions that extend upwardly from the first and second bed frame portions.

15. A method of hauling logs, comprising:
attaching a log hauler device to a powered small machine;
loading a log onto the powered small machine using a log hauler component attached to the log hauler device and while the log hauler device is in a raised configuration;
moving the log hauler device from the raised configuration to a lowered configuration; and
driving the powered small machine while the log is on the the powered small machine and the log hauler device is in the lowered configuration.

16. The method of claim 15, wherein the log hauler component includes a winch, a cable, and a log tongs attached to the cable.

17. The method of claim 15, wherein the log hauler device is movable between the lowered configuration and the raised configuration when attached to the powered small machine.

18. The method of claim 17, further comprising moving the log hauler device from the lowered configuration to the raised configuration before loading the log.

19. The method of claim 15, wherein the powered small machine has a rated capacity less than 2000 lbs.

20. The log hauler device of claim 10, further comprising attachment portions to facilitate positioning of cargo.

* * * * *